United States Patent [19]

Suzuki

[11] 4,454,192

[45] Jun. 12, 1984

[54] PRESSURE SENSITIVE ADHESIVE TAPE

[75] Inventor: Nagayuki Suzuki, Tokyo, Japan

[73] Assignee: Sugawara Industrial Co., Kanagawa, Japan

[21] Appl. No.: 358,421

[22] Filed: Mar. 15, 1982

[30] Foreign Application Priority Data

Nov. 16, 1981 [JP]  Japan ............................... 56-183452

[51] Int. Cl.³ .......................... D04H 1/74; C09J 7/02
[52] U.S. Cl. .................................... 428/294; 428/295;
428/343; 428/344; 428/441; 428/442; 428/515;
428/516; 428/518; 428/913
[58] Field of Search .............. 428/343, 210, 441, 228,
428/229, 114, 344, 294, 295, 297, 515, 516, 518,
442, 913; 15/215

[56]  References Cited

U.S. PATENT DOCUMENTS 3,062,683 11/1962 Kalleberg et al. .............. 428/343 X
3,665,543  5/1972 Nappi ............................. 428/343 X
3,791,912  2/1974 Allard ............................. 428/294 X
3,867,245  2/1975 Herman .......................... 428/294 X
4,303,724 12/1981 Sergeant et al. ................ 428/343 X Primary Examiner—Thomas J. Herbert, Jr.
Attorney, Agent, or Firm—Birch, Stewart, Kolasch & Birch

[57]  ABSTRACT

The present invention comprises an adhesive sheet including a supporting sheet made of thermoplastic resinous material, a plurality of artificial filament yarns arranged substantially parallel to the longitudinal direction of the supporting sheet with at least about one-half of the cross-section of the yarn being buried in and thus strongly adhered to one side of the supporting sheet and an adhesive layer provided on the filament containing side of the supporting sheet.

8 Claims, 3 Drawing Figures

PRESSURE SENSITIVE ADHESIVE TAPE

BACKGROUND OF THE INVENTION

1. Field of the Invention

The present invention relates to a pressure sensitive adhesive tape or sheet and more specifically, to a pressure sensitive adhesive tape or sheet containing a plurality of artificial filament yarns buried in the tape and arranged in parallel to the longitudinal direction of the tape and, having a high tensile strength in the longitudinal direction of the tape.

2. Description of the Prior Art

Conventional strong pressure sensitive tapes with buried-in artificial filament yarns are known, for example, in accordance with the description in the Japanese official bulletin "Published unexamined patent application, Showa 29-2989." This adhesive tape is produced by providing, in advance, an adhesive single-coated tape which has the pressure sensitive adhesive layer on one side of the supporting sheet consisting of resin, paper, etc. A plurality of glass filament yarn fibers are disposed on the adhesive layer parallel to the longitudinal direction of said sheet, with another adhesive layer being applied thereto. In this structure, said filament yarns are thoroughly buried in said pressure sensitive adhesive layer, but they have no contact with the supporting sheet. Such an adhesive tape has the defects that lifting or puckering occurs when unwinding the rolled adhesive tape because the filament yarns are buried in the adhesive layer provided on the supporting sheet and thus, when the rolled adhesive tape is peeled at the end, only the supporting sheet peels off. In addition, the tape itself has the defect that, depending on the types of the applied adhesives, it is liable to age and change its properties in the course of time and, as a result, the filament yarns arranged in parallel along the longitudinal direction of the tape, at the point of manufacture, tend to snake while they are stored on the shelf, and thus the commercial value of the tape is extraordinarily lowered. Accordingly the conventional adhesive tape has serious defects in its manufacturing processes and also in its structure.

Accordingly an object of the present invention is to provide a pressure sensitive adhesive tape, in which filament yarns are arranged in parallel to the longitudinal direction on the supporting sheet, which eliminates lifting and puckering when the rolled tape is unwound and avoids peeling-off of only the supporting sheet at the end of the tape.

Another object of the present invention is to provide a pressure sensitive adhesive tape in which filament yarns arranged in parallel to the longitudinal direction of the supporting sheet at the point of manufacture cause no snaking due to aging and changing its properties in the course of time while it is being stored on shelf.

A further object of the present invention is to provide a pressure sensitive adhesive tape which can be produced by a simple manufacturing process.

SUMMARY OF THE INVENTION

The pressure sensitive adhesive tape of the present invention consists of a supporting sheet made of a thermoplastic resin, a plurality of artificial filament yarns buried in one side of said sheet and in parallel to the longitudinal direction of the sheet to the extent that at least half of the sections of the filament yarns are embedded in and adhere to one side of the supporting sheet and an adhesive layer being aplied to the side of the supporting sheet containing the artificial filament yarns.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
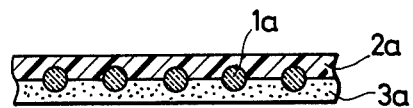
FIG. 1 is an enlarged sectional view taken across the width of the adhesive tape of the present invention.

According to the present invention a molten thermoplastic resin sheet was applied to one side of a plurality of artificial filament yarns arranged in parallel to the longitudinal direction of the sheet until at least half of the cross-section of said filament yarns is buried in said resin sheet. Thereafter, an adhesive layer is applied to the other side of said filament yarns. By such a procedure, the manufacturing process can be simplified and no lifting, puckering, peeling-off or snaking takes place since the plurality of filament yarns are not completely buried in the adhesive layer.

According to the above-mentioned concept, many experiments were carried out. For example, molten polyethylene-vinyl acetate copolymers mixed with wax were coated as a sheet on one side of a plurality of filament yarns arranged in parallel to the longitudinal direction of the resin sheet by using an ordinary roll coater method. Alternatively, a plurality of filament yarns arranged in parallel to the longitudinal direction of the resin sheet to be produced were placed into a gap between a cooling roll and a pressure roll of an ordinary polyethylene laminator and the molten resin sheet was supplied continuously into said gap while said laminator was in operation and a thermoplastic resin sheet, in which one-half of the cross-section of said filament yarns were buried, was provided. Thereafter, an adhesive layer was applied to the filament containing side of said thermoplastic resinous sheet and thus, the pressure sensitive adhesive tape of the present invention was obtained.

It has been confirmed from the results of the tests of these tapes that no lifting or puckering of the resin sheet takes place when unwinding the rolled tape, and no peeling-off of only the resin sheet was seen. Also no snaking of the filament yarns were observed over a long period of time, because at least a part of the filament yarns were buried in the resin sheet and thus strongly adhered to the resin sheet. On the basis of the above-described experiments, the present invention has been completed.

Figure 2:
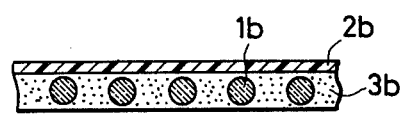
FIG. 2 is an enlarged sectional view taken across the width of conventional adhesive tapes of the same type.

The adhesive tape of the present invention will be described in comparison with the conventional tapes by referring to the drawings as follows:

FIG. 1 and FIG. 2 are enlarged sectional views taken across the width of the tape of the present invention and the conventional tape, respectively.

In the tape of the present invention shown in FIG. 1, elements 1a are glass filament yarns, element 2a is a polyethylene resin sheet and element 3a is a known adhesive layer. As shown in the figure, it is required that at least one-half of the filament yarns sections 1a are buried in the resin sheet 2a.

In the conventional tape showing in FIG. 2, elements 1b are glass filament yarns, element 2b is supporting sheet made of paper or resin, and 3b is a known adhesive layer. As shown in the figure, filament yarns 1b are completely buried only in the adhesive layer 3b. As mentioned above, at least half of the sections of the filament yarns of the tape of the present invention are embedded in the resin sheet, whereas, on the contrary, the entire filament yarns of the conventional tape are embedded in or surrounded by the adhesive layer. Accordingly, in the tape of the present invention, the filament yarns are not isolated from the supporting resin sheet, but are embedded in both the sheet and the adhesive. In these respects, these two tapes are thoroughly different from each other in their structure and, as a result, different effects are obtained therefrom.

In the above description of the FIG. 1, polyethylene is adopted as the material for the resin sheet, but it is readily apparent that other thermoplastic resins, such as polyvinylchloride, ethylene-vinylacetate copolymer, polypropylene, styrene resin, etc. can also be used. As filament yarns, artificial filament yarns, for example, inorganic filament yarns of glass or metal, regenerated filament yarns of rayon or bemberg and synthetic filament yarns of polyesters and polyamides, etc. can be used.

Filament yarn mentioned in the present invention include monofilament yarns, multifilament yarn twisted together with monofilaments and plied yarns twisted together with multifilament yarns.

It is required that the filament yarn should have higher melting points than the resin materials used for the sheet and that they should adhere to said resins mechanically and/or chemically. Therefore, an appropriate combination of yarns and resins should be chosen, and, in some cases, surface treatment should be done on the filament yarns to improve its adhesive strength. In addition, to obtain perfect adhesion between filament yarns and the resin sheet, at least half of the section of the filament yarns should be buried in the resin sheet.

Figure 3:
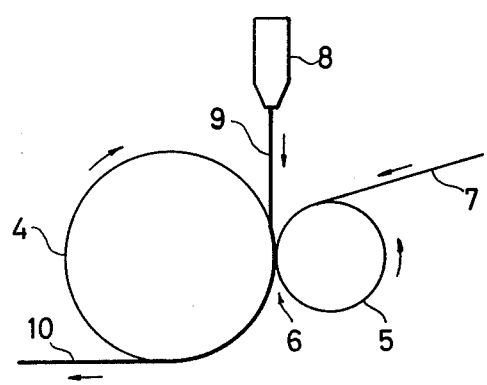
FIG. 3 describes the manufacturing process of one embodiment of the adhesive tape according to the present invention.

One embodiment of the present invention will be described according to the manufacturing process as follows:

In this embodiment, the adhesive tape is produced with the use of a known polyethylene laminator. Referring to FIG. 3, elements 4 and 5 are a cooling roll and a rubber coated pressure roll, respectively of the polyethylene laminator and are arranged with a predetermined gap 6. Element 7 represents a predetermined number of filament yarns positioned in parallel with a predetermined spacing in the longitudinal direction, and being conveyed on the pressure roll 5 from the right, to the gap 6 between the two rolls, and passing under the cooling roll 4 and pulled out from the bottom to the left. Element 8 is a T die arranged above the gap 6 between the rolls 4 and 5, reference numeral 9 is the molten polyethylene resin sheet pushed out from the T die 8, and element 10 is the polyethylene resin sheet in which the filament yarns to make the basic material for the tape of the present invention are buried. Glass filament yarns used in the embodiment are ECG 75-1/0 1Z (tex according to JIS R 3413: 67.5, thickness: 0.16 mm, minimum tensile strength 30 g/tex) produced by Fuji Fiber Glass Co. Ltd. in Japan. After arranging these filament yarns in parallel in 1000 mm widths at the rate of 36 yarns in a 25 mm width in the gap 6 between the cooling roll 4 and pressure roll 5, the two rolls 4 and 5 are put into operation and, at the same time, polyethylene resin molten at 300° C. is made to continually flow down from T die 8 as a resin sheet 9 and the filament yarn 7 are coated by the resin in the gap 6 in such a way that about one-half of the sections of the filaments are enveloped in the molten resin. The molten resin in which the filament yarns 7 are buried is cooled by the cooling roll 4, to become a polyethylene resin sheet 10 containing buried filament yarns to make the basic material of the adhesive tape which is wound at the end. Subsequently, a known adhesive, e.g., a rubber-base adhesive is applied by a known method to that side of the resin sheet 10 containing the filament yarns and thus the tape of the invention can be easily obtained.

The properties of the tape obtained were tested in accordance with paragraph 8 (adhesive strength) paragraph 9 (low speed unwinding force), paragraph 10 (high speed unwinding force) and paragraph 15 (shelf life) of JIS Z 0237 "Testing method of pressure sensitive adhesive tapes and sheets" and the results thereof are shown in comparison with the identical test results of the conventional tapes:

| | Test results | |
|---|---|---|
| Test points | The tape of the invention | The conventional tape |
| 180° adhesion (paragraph 8) | 0.8 kgf/25 mm width | 0.8 kgf/25 mm width |
| Adhesive strength between resin sheet and filament yarns (paragraph 8) | Resin sheet does not peel off from filament yarns | Resin sheet peels off from filament yarns at 0.9 kgf/25 mm width |
| Shelf life (paragraph 15) after keeping at temperature 65 ± 2° C. and relative humidity 80 ± 5% for 24 hours, left in room temperature longer than 4 hours | No disorder of filament yarns seen | Disorder of filament yarns seen |
| Lifting and peeling-off of resin sheet caused by unwinding | None | Only the sheet easily peels off and puckering occurs because of lifting of the sheet at the end of the tape |

According to the above table it is clear that, when compared with a conventional tape which has filament yarns thoroughly buried in the adhesive layer and isolated from the supporting sheet, the tape of the present invention has superior properties such that there is no lifting, puckering nor peeling off of the resin sheet in unwinding the tape and the filament yarns do not become disarranged while the tape is on the shelf because at least a part of the filament yarns are buried directly in the thermoplastic resin supporting sheet and thus firmly adhere to one another.

Though it is not mentioned in the above embodiment, the adhesive tape with the identical properties is also obtainable by coating molten resin, which is a mixture of ethylene-vinyl acetate copolymer and wax on one side of the filament yarns arranged in parallel by an ordinary roll coater method without using a laminator, and then coating a known adhesive layer on the other side of the filament yarns to make an adhesive tape. It is, however, possible to more efficiently produce the tape of the present invention with the use of the laminator.

In addition, an adhesive tape with filament yarns thoroughly buried in the resin sheet is obtainable by applying a molten resin on both sides of a plurality of filament yarns arranged parallel in the longitudinal direction. In this case, the process is somewhat complicated.

What is claimed is:

1. A flexible pressure sensitive adhesive sheet including a supporting sheet made of a thermoplastic resinous material, a plurality of artificial filament yarns arranged substantially parallel to the longitudinal direction of said supporting sheet with a predetermined space provided therebetween, said filament yarns being buried in one side of said supporting sheet up to at least about one-half of their cross-sections, thereby strongly adhering the filament yarns to said sheet, and a pressure sensitive adhesive layer provided on said filament yarn containing side of the sheet, whereby the artificial filament yarns are embedded in both the supporting sheet and the adhesive layer, thereby providing a high tensile strength in the longitudinal direction of the tape.

2. The pressure sensitive adhesive sheet according to claim 1, wherein the artificial filament yarn is a monofilament.

3. The pressure sensitive adhesive sheet according to claim 1, wherein the artificial filament yarn is a single filament yarn twisted with a plurality of monofilaments.

4. The pressure sensitive adhesive sheet according to claim 1, wherein said artificial filament yarn is a combined filament yarn twisted with a plurality of single filament yarns.

5. The pressure sensitive adhesive sheet according to claim 1, wherein said artificial filament yarn is selected from the group consisting of regenerated filament yarns, synthetic filament yarns and inorganic filament yarns.

6. The pressure sensitive adhesive sheet according to claim 1, wherein the thermoplastic resinous material is selected from the group consisting of polyvinyl chloride, polyethylene, polypropylene, ethylene-vinyl acetate copolymer and polystyrene and the filament yarn is made of a material selected from the group consisting of glass, metal, regenerated yarns of rayon, regenerated yarns of bemberg, polyesters and polyamides.

7. The pressure sensitive adhesive sheet according to claim 1, wherein the thermoplastic resinous material is polyethylene and the filament yarn is glass.

8. The pressure sensitive adhesive sheet according to claim 1, wherein the thermoplastic material is an ethylenevinyl acetate copolymer which is mixed with a wax and applied to one side of the filament yarns.

* * * * *